United States Patent
Eoka

(10) Patent No.: US 9,306,405 B2
(45) Date of Patent: Apr. 5, 2016

(54) POS TERMINAL AND METHOD USED FOR A POS TERMINAL

(71) Applicant: Kenji Eoka, Singapore (SG)

(72) Inventor: Kenji Eoka, Singapore (SG)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 574 days.

(21) Appl. No.: 13/713,354

(22) Filed: Dec. 13, 2012

(65) Prior Publication Data

US 2013/0229150 A1 Sep. 5, 2013

(30) Foreign Application Priority Data

Mar. 5, 2012 (JP) .................................. 2012-048151

(51) Int. Cl.
*H02J 7/00* (2006.01)

(52) U.S. Cl.
CPC ............. *H02J 7/0042* (2013.01); *H02J 7/0013* (2013.01)

(58) Field of Classification Search
USPC .......................................................... 320/107
See application file for complete search history.

(56) References Cited

U.S. PATENT DOCUMENTS

| | | | | |
|---|---|---|---|---|
| 5,705,910 A | * | 1/1998 | Kito et al. ...................... | 320/132 |
| 5,880,565 A | * | 3/1999 | Watanabe ...................... | 318/139 |
| 5,959,368 A | * | 9/1999 | Kubo et al. ...................... | 307/18 |
| 2006/0267547 A1 | * | 11/2006 | Godovich ...................... | 320/107 |

* cited by examiner

*Primary Examiner* — Samuel Berhanu

(74) *Attorney, Agent, or Firm* — Amin, Turocy & Watson, LLP

(57) ABSTRACT

A POS terminal, includes a battery box having a box-side commercial power source circuit to supply power from a commercial power source; a battery charge circuit to charge batteries by power supplied from the box-side commercial power source circuit; a battery discharge circuit to discharge the batteries to a POS terminal main body side; and a charge and discharge changeover switch which connects a battery discharge circuit to the batteries to cause the batteries to be discharged when the battery box is attached to a POS terminal main body, and connects a battery charge circuit to the batteries to cause the batteries to be charged when the battery box is detached from the POS terminal main body.

7 Claims, 5 Drawing Sheets

POS TERMINAL AND METHOD USED FOR A POS TERMINAL

CROSS-REFERENCE TO RELATED APPLICATION

This application is based upon and claims the benefit of priority from the prior Japanese Patent Application No. 2012-048151, filed on Mar. 5, 2012, the entire contents of which are incorporated herein by reference.

FIELD

Embodiments relate to a POS terminal installed in a sales store and a method used for a POS terminal.

BACKGROUND

In POS (Point Of Sale) terminals to register and update point of sale information including a trade name, a price, a quantity, time and date, power is under the software control. Except for the purpose of fault tolerance to deal with the case in which power stoppage occurs, and the case in which the main power source is turned OFF by a user, battery driven type POS terminals have been widely used for the purpose of installing a selling space freely in the store or outdoors, are provided with a function to change over the power supplying source from a main power source (a commercial power source) to a battery acting as an auxiliary power source, and can be driven under the circumstances in which power can not be supplied from the main power source.

However, in the conventional battery driven type POS terminals, since it is necessary that the POS terminal main body is connected to the main power source to thereby charge the battery, or the battery is charged with an exclusive battery charger after the battery is taken out from the inside of the POS terminal, the work burden in charging the battery was large, particularly in case that the POS terminal is installed at a position distant from the main power source.

DETAILED DESCRIPTION

A POS terminal according to an embodiment includes a POS terminal main body to register and update point of sale information, a battery box which is detachably connected to the POS terminal main body, and a plurality of batteries which are detachably housed in the battery box and supply power to the POS terminal main body connected through the battery box. The battery box includes a box side commercial power source circuit to supply power from a commercial power source, a battery charge circuit to charge the batteries by the power supplied from the box side commercial power source circuit; a battery discharge circuit to discharge the batteries to the POS terminal main body side, and a charge and discharge changeover switch which connects the battery discharge circuit to the batteries to cause the batteries to be discharged when the battery box is attached to the POS terminal main body, and connects the battery charge circuit to the batteries to cause the batteries to be charged when the battery box is detached from the POS terminal main body.

Hereinafter, embodiments will be described in detail using the drawings.

Figure 1:
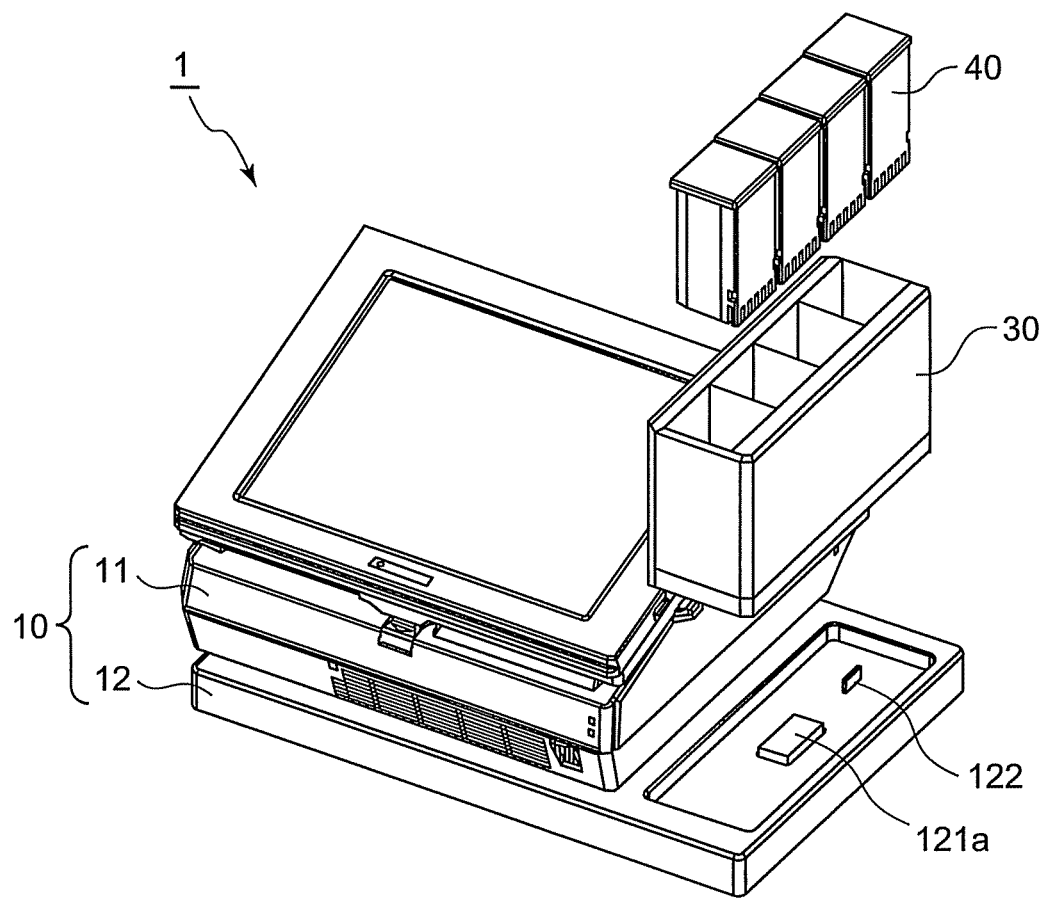
FIG. 1 is an exploded view to describe the structure of a POS terminal according to an embodiment.

FIG. 1 is an exploded view to describe the structure of a POS terminal 1 according to a first embodiment. In addition, FIG. 2 is a perspective view showing the structure of a base member 12 shown in FIG. 1, and FIG. 3 is a bottom view of a POS terminal main body 10 shown in FIG. 1.

As shown in FIG. 1, the POS terminal 1 is provided with the POS terminal main body 10 to register and update point of sale information, a battery box 30 which is connected detachably to the POS terminal main body 10, and a plurality of batteries 40 which are housed detachably in the battery box 30 and supply power to the POS terminal main body 10 connected through the battery box 30.

Figure 2:
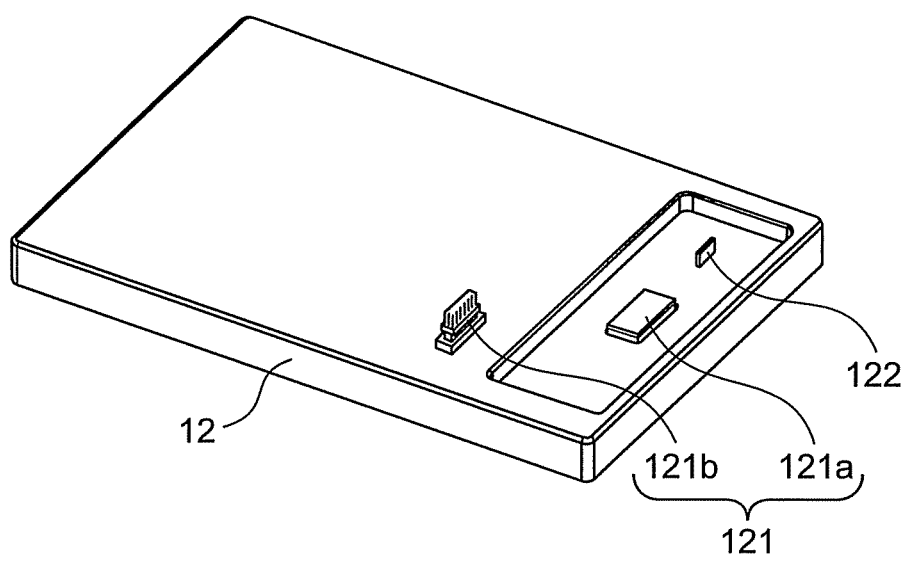
FIG. 2 is a perspective view of the base member shown in FIG. 1.
Figure 3:
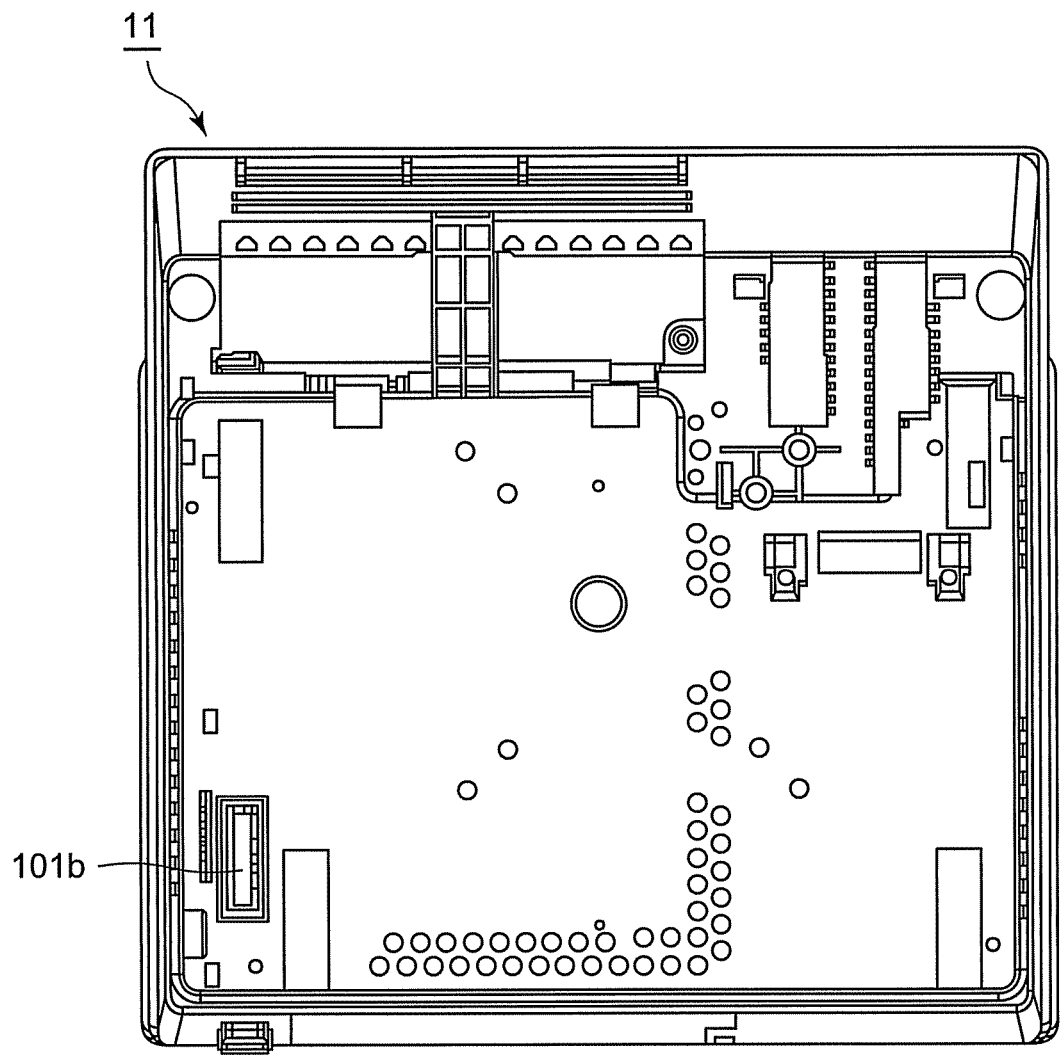
FIG. 3 is a bottom view of the POS terminal main body shown in FIG. 1.

In addition, as shown in FIG. 2, the base member 12 of the POS terminal main body 10 fixes a chassis 11 to house various equipments and the battery box 30 for loading them. A connector 121 is formed on a box loading side of the base member 12, and is connected to a battery discharge circuit 303 described later of the battery box 30 to mediate the power supplying to the POS terminal main body 10. A sensor detecting member 122 is a member formed on the box loading side of the base member 12 in a convex shape, and when it is attached to or detached from a concave connector (not shown) of the battery box 30, an attaching and detaching detecting sensor 305 described later detects an attaching and detaching state of the battery box 30 through it. As shown in FIG. 1 and FIG. 2, a main body connecting terminal 121a is connected to the battery box 30. In addition, as shown in FIG. 3, a box connecting terminal 121b of the connector 121 is connected to a terminal of a connector 101b which is provided at the bottom face side of the chassis 11 at the upper portion of the POS terminal main body 10

Figure 4:
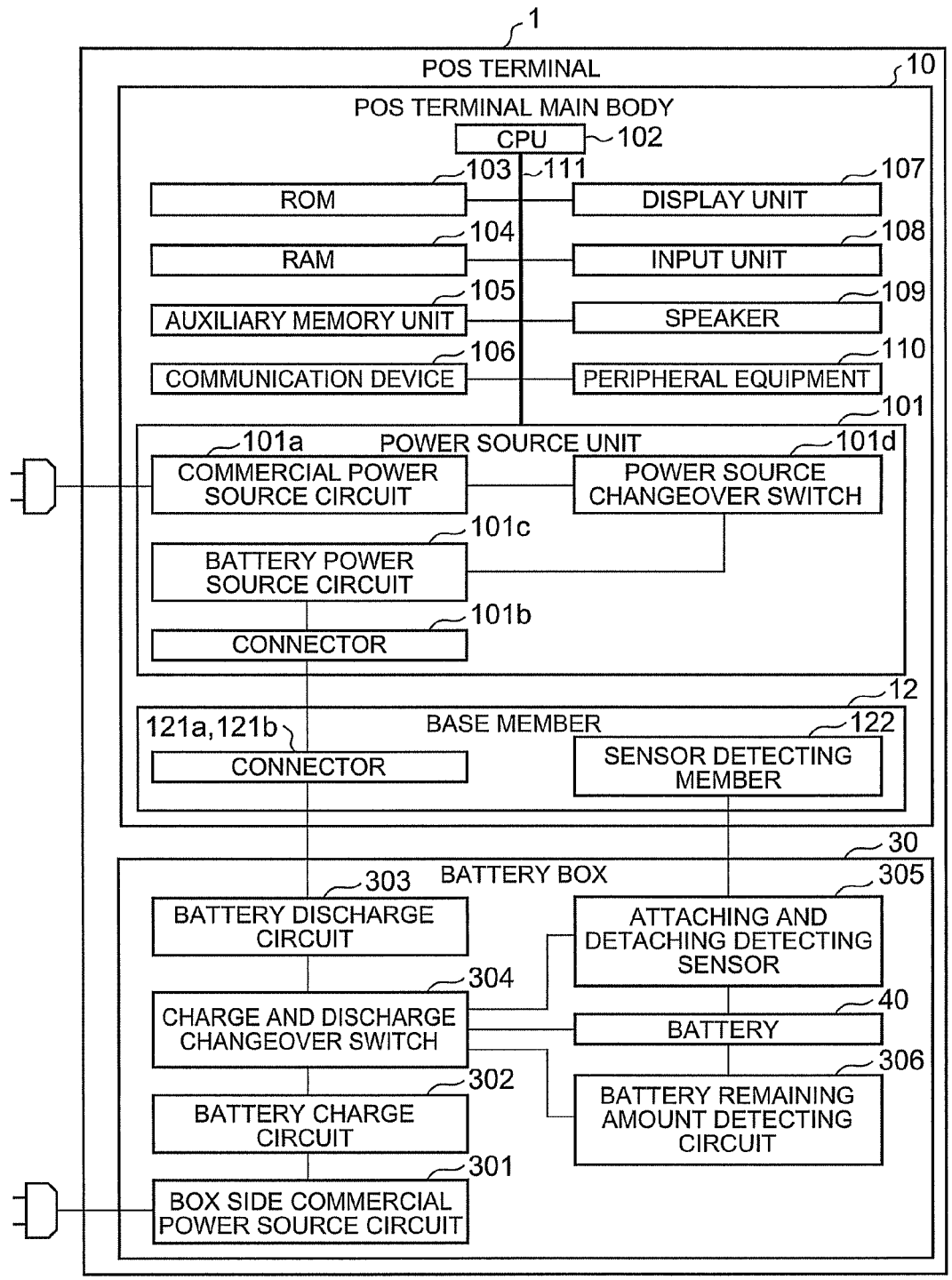
FIG. 4 is a block diagram showing an example of the whole configuration of the POS terminal shown in FIG. 1.

FIG. 4 is a block diagram showing an example of the whole configuration of the POS terminal 1 shown in FIG. 1. As shown in the drawing, in the POS terminal main body 10, a power source unit 101, a CPU 102, a ROM (Read Only Memory) 103, a RAM (Random Access Memory) 104, an auxiliary memory unit 105 such as a hard disc drive, a communication device 106, a display unit 107 to display point of sale information, an input unit 108 such as a keyboard or a touch panel with which a user inputs point of sale information and an operation command, a speaker 109, and peripheral equipments 110 such as a printer and a bar code reader are electrically connected through a bus 111.

The power source unit 101 changes over the power supplied from a main power source such as a commercial power source or an auxiliary power source such as the batteries 40 under the control of the CPU 102, to thereby supply power to the respective units of the POS terminal main body 10. Here, the power source unit 101 is provided with a commercial power source circuit 101a, the connector 101b, a battery power source circuit 101c and a power source changeover switch 101d. The commercial power source circuit 101a supplies power from the connected commercial power source. The battery power source circuit 101 is connected to the batteries 40 through the connector 101b and the battery box 30, and supplies power from the batteries 40. The power source changeover switch 101d, when it is detected that the power supply from the commercial power source circuit 101a is stopped, changes over the power supplying source from the commercial power source circuit 101a side to the battery power source circuit 101c side.

The CPU 102 expands a program stored in the ROM 103 to the working area of the RAM 104 and executes sequentially the program, to thereby centrally control the operation of the POS terminal main body 10. The RAM 104 provides the working area when the CPU 102 executes the program. The ROM 103 stores the program and various setting information.

For example, the CPU 102 executes sequentially the program (software) stored in the ROM 103, to thereby perform the register and update processing of the point of sale information in response to the operation input from the input unit 108. Similarly, the CPU 102 executes sequentially the program stored in the ROM 103, to thereby change over the power supplying of the power source unit 101 to the power supplying from the auxiliary power source such as the batteries 40, in case that the power supplying from the main power source in the power source unit 101 is stopped by various factors such as a case in which power stoppage occurs or the main power source is made OFF by a user. The CPU 102 connects to a store server (not shown) through the communication device 106 which performs wired or wireless communication, and transmits the point of sale information stored in the RAM 104 and the auxiliary memory unit 105 in real time.

Next, the configuration of the battery box 30 will be described. As shown in FIG. 4, the battery box 30 is provided with a box side commercial power source circuit 301, a battery charge circuit 302, the battery discharge circuit 303, a charge and discharge changeover switch 304, the attaching and detaching detecting sensor 305 and a battery remaining amount detecting circuit 306.

The box side commercial power source circuit 301 supplies power from the connected commercial power source. The battery charge circuit 302 charges the batteries 40 with the power supplied from the box side commercial power source circuit 301. The battery discharge circuit 303 discharges the electricity stored within the batteries 40 to the POS terminal main body 10 side. The charge and discharge changeover switch 304 connects the battery discharge circuit 303 to the batteries 40 to cause the batteries 40 to be discharged when the battery box 30 is attached to the POS terminal main body 10, and connects the battery charge circuit 302 to the batteries 40 to cause the batteries 40 to be charged when the battery box 30 is detached from the POS terminal main body 10.

The attaching and detaching detecting sensor 305 detects an attaching and detaching state of the battery box to the POS terminal main body 10, and outputs the detection signal to the charge and discharge changeover switch 304. The battery remaining amount detecting circuit 306 detects battery remaining amounts of a plurality of the respective housed batteries 40, and outputs the detection signals to the charge and discharge changeover switch 304 as control signals. Accordingly, the charge and discharge changeover switch 304 causes the battery charge circuit 302 to perform charging in order from the battery 40 in which the battery remaining amount detected by the battery remaining amount detecting circuit 306 is small out of a plurality of the batteries 40, and causes the battery discharge circuit 303 to perform discharging in order from the battery 40 in which the battery remaining amount is large.

Figure 5:
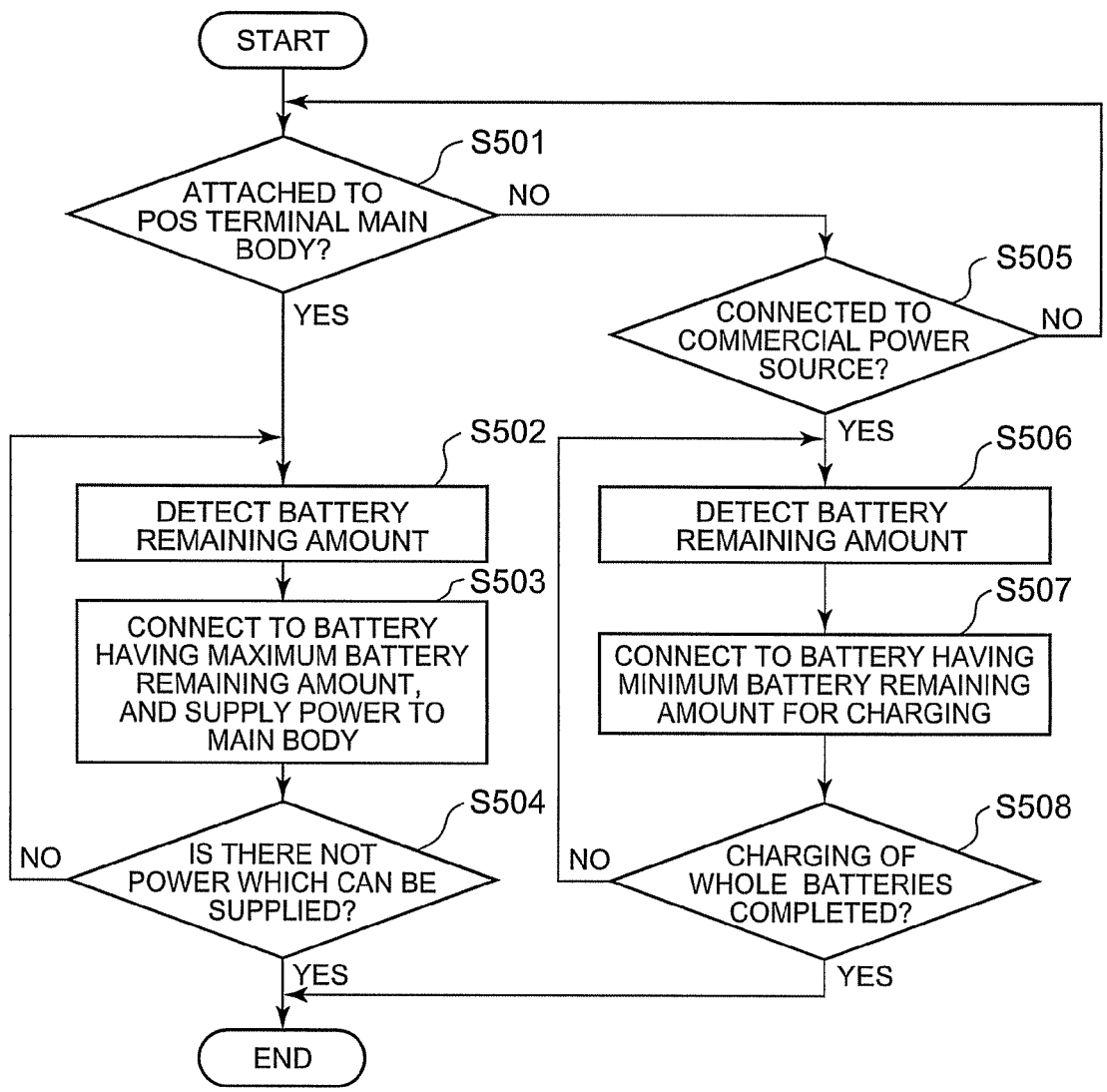
FIG. 5 is a flow chart showing a specific example of a control operation for the charge and discharge changeover in the battery box shown in FIG. 1.

FIG. 5 is a flow chart showing a specific example of the control operation for the charge and discharge changeover in the battery box 30 shown in FIG. 1. In addition, it is assumed that these processings are controlled by a control chip (not shown) housed in the battery box 30.

In S501, whether or not the battery box 30 is attached to the POS terminal main body 10 is determined based on the presence or absence of the detection signal from the attaching and detaching detecting sensor 305. Here, when it is determined that the battery box 30 is attached to the POS terminal main body 10, the processing goes to S502. On the other hand, when it is determined that the battery box 30 is not attached to the POS terminal main body 10, the processing goes to S505.

In S502, the battery remaining amount detecting circuit 306 of the battery box 30 detects the battery remaining amounts of a plurality of the housed batteries 40, respectively, and outputs the detection signals to the charge and discharge changeover switch 304.

In S503, the charge and discharge changeover switch 304 of the battery box 30, based on the detection signals, connects the battery having the maximum battery remaining amount out of a plurality of batteries 40 to the battery discharge circuit 303, to thereby cause it to perform discharging. That is, power is supplied to the POS terminal main body 10 side.

In S504, whether or not the discharging of the whole batteries 40 is completed is determined. Here, when it is determined that the discharging has been completed, the processing ends. On the other hand, when it is determined that the discharging has not been completed, the processing returns to S502, and the processings S502-S504 are repeated till the discharging is completed.

In S505, whether or not the box side commercial power source circuit 301 is connected to the commercial power source is determined. Here, when that it is connected to the commercial power source is determined, the processing goes to S506. On the other hand, when that it is not connected to the commercial power source is determined, the processing returns to S501.

In S506, the battery remaining amount detecting circuit 306 of the battery box 30 detects the battery remaining amounts of a plurality of the housed batteries, respectively, and outputs the detection signals to the charge and discharge changeover switch 304.

In S507, the charge and discharge changeover switch 304 of the battery box 30, based on the detection signals, connects the battery having the minimum battery remaining amount out of a plurality of batteries 40, to the battery charge circuit 302, to thereby cause it to perform charging.

In S508, whether or not the charging of the whole batteries 40 is completed is determined. Here, when it is determined that the charging has been completed, the processing ends. On the other hand, when it is determined that the charging has not been completed, the processing returns to S506, and the processings S506-S508 are repeated till the charging is completed.

As described above, according to the present embodiment, in the state in which the POS terminal main body 10 is not present, it is possible to easily charge the battery by connecting the battery box 30 to the commercial power source. In addition, after the charging is completed, since the whole battery box 30 can be attached to the POS terminal main body 10 to thereby enable the battery drive, without taking out the batteries 40 from the battery box 30, work burden of a user can be reduced. In addition, since the battery box 30 has a structure in which a plurality of batteries 40 can be housed, it is possible to select suitable battery 40 depending on the battery remaining amount thereof and to thereby perform charging and discharging effectively.

<Modification>

Figure 6:
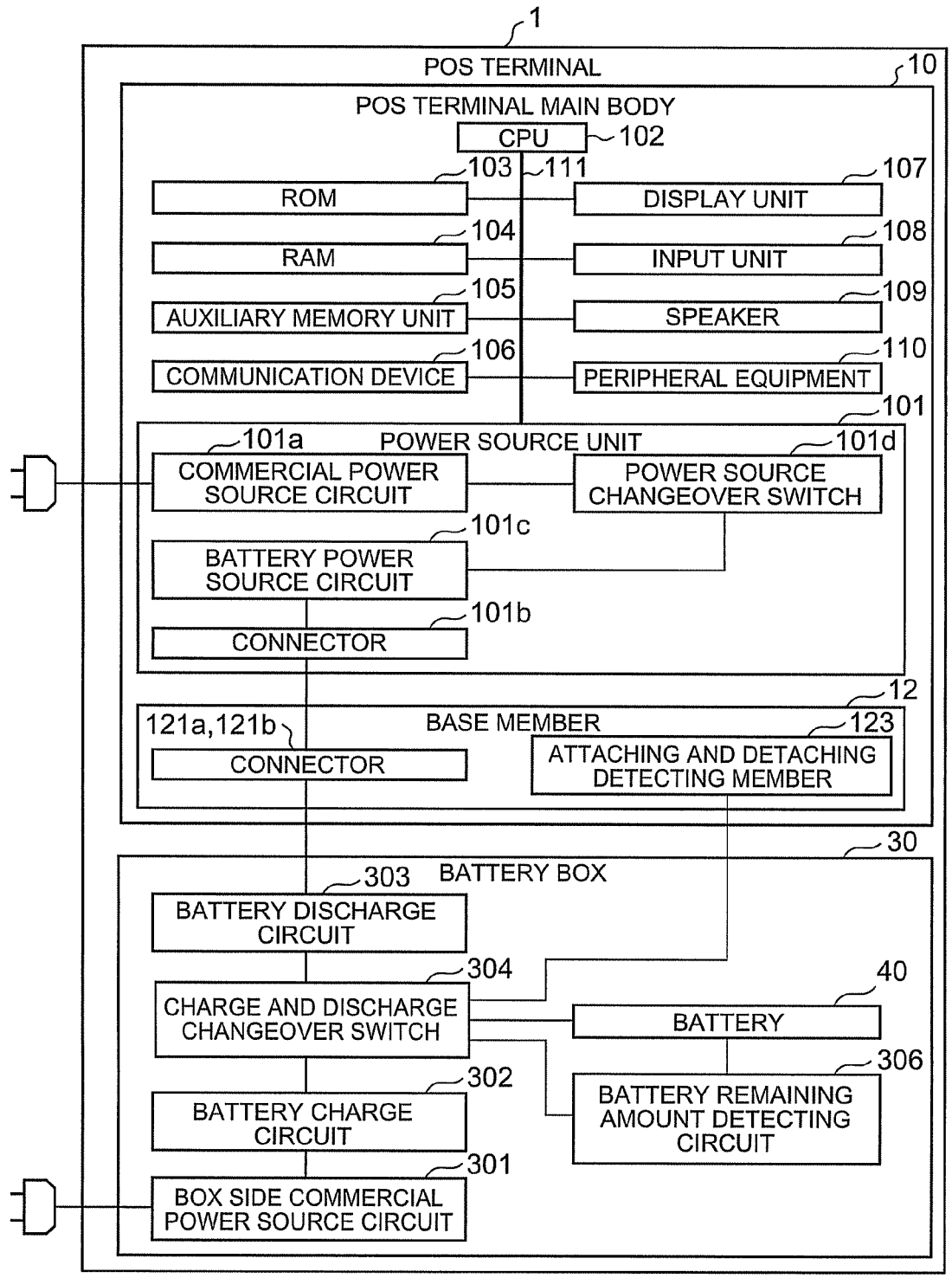
FIG. 6 is a block diagram showing an example of the whole configuration of a POS terminal according to a modification to the embodiment shown in FIG. 1.

FIG. 6 is a block diagram showing an example of the whole configuration of a POS terminal 1 according to a modification to the embodiment shown in FIG. 1. In addition, the symbols which are commonly used in FIG. 1 to FIG. 4 designate the same objects, and therefore the description thereof will be omitted, and the only different points will be described. Here, different from the case of FIG. 4, a configuration is used in which an attaching and detaching detecting sensor 123 is provided inside the base member 12 of the POS terminal main body 10, and the attaching and detaching detecting sensor 305 is removed from the inside of the battery box 30. The detection signal in the attaching and detaching detecting sensor 123 is outputted not only to the charge and discharge changeover switch 304 of the battery box 30 but also to the power source changeover switch 101d of the power source unit 101. Since the POS terminal 1 is configured like this, it is possible to suppress the function which is loaded in the battery box 30.

In addition, in the above-described embodiment, the configuration is used in which the charge and discharge changeover switch 304 changes over the connection circuit to the battery 40 automatically based on the detection signal outputted from the attaching and detaching detecting sensor 305 provided in the battery box 30, but the connection circuit may be changed over not based on the detection signal of the sensor but by another method. For example, a construction may be used in which at the same time the sensor detecting member 122 formed in a convex shape is inserted into the concave portion of the battery box 30, the charge and discharge changeover switch 304 is changed over with a mechanical structure. In addition, a plurality of the batteries 40 which have been previously divided into a system use and a use for the peripheral equipment 110 such as a printer are used, and thereby the fault tolerance function can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A point of sale (POS) terminal, comprising:
a POS terminal main body to register and update point of sale information;
a battery box which is detachably connected to the POS terminal main body; and
a plurality of batteries which are detachably housed in the battery box and supply power to the POS terminal main body connected through the battery box;
wherein the battery box includes
a box-side commercial power source circuit to supply power from a commercial power source;
a battery charge circuit to charge the plurality of batteries by the power supplied from the box-side commercial power source circuit;
a battery discharge circuit to discharge the batteries to the POS terminal main body side; and
a charge and discharge changeover switch which connects the battery discharge circuit to the plurality of batteries to cause the plurality of batteries to be discharged when the battery box is attached to the POS terminal main body, and connects the battery charge circuit to the plurality of batteries to cause the plurality of batteries to be charged when the battery box is detached from the POS terminal main body;
wherein the POS terminal main body comprises:
a commercial power source circuit to supply power from the commercial power source to drive the POS terminal;
a battery power source circuit to supply power discharged from the battery discharge circuit of the battery box to drive the POS terminal;
a power source changeover switch which changes over a power supplying source for driving the POS terminal from the commercial power source circuit to the battery power source circuit when a stop of power supplying from the commercial power source circuit is detected.

2. The POS terminal according to claim 1, wherein:
the battery box further includes an attaching and detaching detecting sensor to detect an attaching and detaching state of the battery box to the POS terminal main body; and
the charge and discharge changeover switch automatically changes over a connection circuit to the plurality of batteries based on a detection signal in the attaching and detaching detecting sensor.

3. The POS terminal according to claim 1, wherein:
the battery box further includes a battery remaining amount detecting circuit to detect battery remaining amounts of the plurality of batteries; and
the charge and discharge changeover switch causes the battery charge circuit to perform charging in order from the battery in which the battery remaining amount detected by the battery remaining amount detecting circuit is small, and causes the battery discharge circuit to perform discharging in order from the battery in which the battery remaining amount is large.

4. The POS terminal according to claim 3, wherein the POS terminal main body includes:
a base member on which the battery box is loaded;
a connector which is formed on a box loading face side of the base member and is connected to the battery discharge circuit of the battery box to mediate power supplying; and
a sensor detecting member which is formed on the box loading face side of the base member and through which the attaching and detaching detecting sensor detects when the battery box is attached.

5. A method used for a point of sale (POS) terminal having a POS terminal main body which stores point of sales information, a battery box which is detachably connected to the POS terminal main body and a battery, detachably housed in the battery box, which supplies power to the POS terminal main body via the battery box, comprising:
discharging power of the battery to the POS terminal main body, when the battery box is connected to the POS terminal main body;
charging the battery by power supplied from a first commercial power circuit in the battery box, when the battery box is detached from the POS terminal main body;
supplying power from a second commercial power source by a second commercial power source circuit in the POS terminal main body to drive the POS terminal; and
switching, as a power supplying source, from the second commercial power source circuit to the battery to drive the POS terminal, when power supplying from the second commercial power source circuit is stopped.

6. The method according to claim 5, further comprising, detecting an attaching or detaching state of the battery box to the POS terminal main body;
switching, based on the detecting, a battery charge circuit to charge the battery by the power supplied from the first commercial power source circuit and a battery discharge circuit to discharge power of the battery to the POS terminal main body.

7. The method according to claim 6, further comprising, detecting battery remaining amounts of the battery;
wherein the battery, whose battery remaining amount is the smallest among a plurality of batteries, which is detected by the step of the detecting, is charged, and
the battery, whose battery remaining amount is the largest among a plurality of batteries, which is detected by the step of the detecting, is discharged.

\* \* \* \* \*